(12) United States Patent
Ladas et al.

(10) Patent No.: US 7,048,198 B2
(45) Date of Patent: May 23, 2006

(54) CODED PATTERN FOR AN OPTICAL DEVICE AND A PREPARED SURFACE

(75) Inventors: Corey Ladas, Bellevue, WA (US); Glen Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 10/829,632

(22) Filed: Apr. 22, 2004

(65) Prior Publication Data

US 2005/0236492 A1 Oct. 27, 2005

(51) Int. Cl.
*G06K 19/06* (2006.01)
*G06K 7/14* (2006.01)
*G06K 7/10* (2006.01)

(52) U.S. Cl. ...................... 235/494; 235/454

(58) Field of Classification Search ................ 235/494, 235/462.08, 462.09, 462.1, 462.11, 462.49, 235/472.03, 454, 462.01
See application file for complete search history.

(56) References Cited

U.S. PATENT DOCUMENTS

| | | | |
|---|---|---|---|
| 5,051,736 A | | 9/1991 | Bennett et al. |
| 5,107,541 A | | 4/1992 | Hilton |
| 5,128,526 A | * | 7/1992 | Yoshida ...................... 235/494 |
| 5,408,543 A | * | 4/1995 | Yoshida ...................... 235/494 |
| 5,410,620 A | * | 4/1995 | Yoshida ...................... 235/494 |
| 5,442,147 A | | 8/1995 | Burns et al. |
| 5,852,434 A | | 12/1998 | Sekendur |
| 5,936,228 A | * | 8/1999 | Yoshihara ................... 235/494 |
| 5,937,110 A | | 8/1999 | Petrie et al. |
| 6,043,899 A | * | 3/2000 | Morohashi et al. ......... 358/1.18 |
| 6,116,510 A | * | 9/2000 | Nishino ...................... 235/494 |
| 6,208,771 B1 | | 3/2001 | Jared et al. |
| 6,234,392 B1 | * | 5/2001 | Murakami ................... 235/494 |
| 6,310,988 B1 | | 10/2001 | Flores et al. |
| 6,454,482 B1 | | 9/2002 | Silverbrook et al. |
| 6,474,888 B1 | | 11/2002 | Lapstun et al. |
| 6,502,756 B1 | | 1/2003 | Fåhraeus |
| 6,548,768 B1 | | 4/2003 | Pettersson et al. |
| 6,570,104 B1 | | 5/2003 | Ericson et al. |
| 6,586,688 B1 | | 7/2003 | Wiebe |
| 6,592,039 B1 | | 7/2003 | Smith et al. |
| 6,622,276 B1 | * | 9/2003 | Nagasaki et al. ........... 714/752 |
| 6,650,320 B1 | | 11/2003 | Zimmerman |
| 6,663,008 B1 | | 12/2003 | Pettersson et al. |
| 6,666,376 B1 | | 12/2003 | Ericson |
| 6,667,695 B1 | | 12/2003 | Pettersson et al. |
| 6,674,427 B1 | | 1/2004 | Pettersson et al. |

(Continued)

OTHER PUBLICATIONS

Wolfgang et al., "A Watermark for Digital Images," IEEE, Sep. 1996, pp. 219-222, USA.

(Continued)

*Primary Examiner*—Jared J. Fureman
(74) *Attorney, Agent, or Firm*—Senniger Powers

(57) ABSTRACT

Encoding data in a pattern of symbols on a surface. A processor separates an ordered sequence of digits representative of the encoded data into a plurality of sequential windows. Each of the sequential windows includes a partial sequence of the ordered sequence of digits. The processor further transforms the partial sequence included in each sequential window into a series of digits. A symbol is arranged within a plurality of surface windows on the surface. Each surface window corresponds to one of the sequential windows. The symbol is positioned within each surface window based on one of the transformed series of digits. And the position of the symbol within the surface window is indicative of the encoded data.

15 Claims, 11 Drawing Sheets

U.S. PATENT DOCUMENTS

| | | |
|---|---|---|
| 6,686,579 B1 | 2/2004 | Fagin et al. |
| 6,689,966 B1 | 2/2004 | Wiebe |
| 6,781,694 B1 * | 8/2004 | Nahum et al. ............... 235/494 |
| 6,929,183 B1 * | 8/2005 | Pettersson ................... 235/494 |
| 6,959,866 B1 * | 11/2005 | Takahashi et al. .......... 235/454 |
| 6,966,495 B1 * | 11/2005 | Lynggaard et al. .... 235/472.01 |
| 2003/0029919 A1 | 2/2003 | Lynggaard et al. |
| 2003/0066896 A1 * | 4/2003 | Pettersson et al. .......... 235/494 |
| 2003/0085868 A1 | 5/2003 | Paul et al. |
| 2003/0095098 A1 | 5/2003 | Paul et al. |
| 2003/0095724 A1 | 5/2003 | Kia et al. |
| 2003/0095725 A1 | 5/2003 | Kia et al. |
| 2003/0095726 A1 | 5/2003 | Kia et al. |
| 2003/0128194 A1 | 7/2003 | Pettersson |
| 2003/0128196 A1 | 7/2003 | Lapstun et al. |
| 2005/0189407 A1 * | 9/2005 | Wiebe et al. .......... 235/472.03 |
| 2005/0211783 A1 * | 9/2005 | Chou .................... 235/472.03 |

OTHER PUBLICATIONS

Hecht, "Printed Embedded Data Graphical User Interfaces," IEEE, Mar. 2001, pp. 47-55, USA.

* cited by examiner

FIG. 2

$$\begin{bmatrix} 0 & 1 & 1 & 0 & 0 & 0 & 1 & 1 & 1 & 0 \\ 1 & 1 & 1 & 0 & 0 & 1 & 0 & 0 & 1 & 0 \\ 0 & 0 & 1 & 1 & 1 & 0 & 0 & 0 & 1 & 1 \\ 1 & 0 & 0 & 1 & 0 & 0 & 0 & 0 & 1 & 0 \end{bmatrix}$$

ORDERED SEQUENCE OF DIGITS DIVIDED INTO SEQUENTIAL WINDOWS:

100 | 110 | 001 | 101 | 111 | 110 | 100 | 010 | 000 | 101 | 100 | 101
$\underbrace{\phantom{100}}_{Wseq}$

THE Y SET REPRESENTED AS AN ARRAY/MATRIX OF SYMBOLS WITHIN SURFACE WINDOWS:

| | | | |
|---|---|---|---|
| 010 | 100 | 101 | 111 |
| 100 | 100 | 001 | 101 |
| 110 | 000 | 010 | 101 |
| 111 | 011 | 100 | 110 |
| 101 | 011 | 010 | 111 |
| 000 | 011 | 111 | 011 |
| 110 | 010 | 011 | 101 |
| 100 | 010 | 110 | 100 |

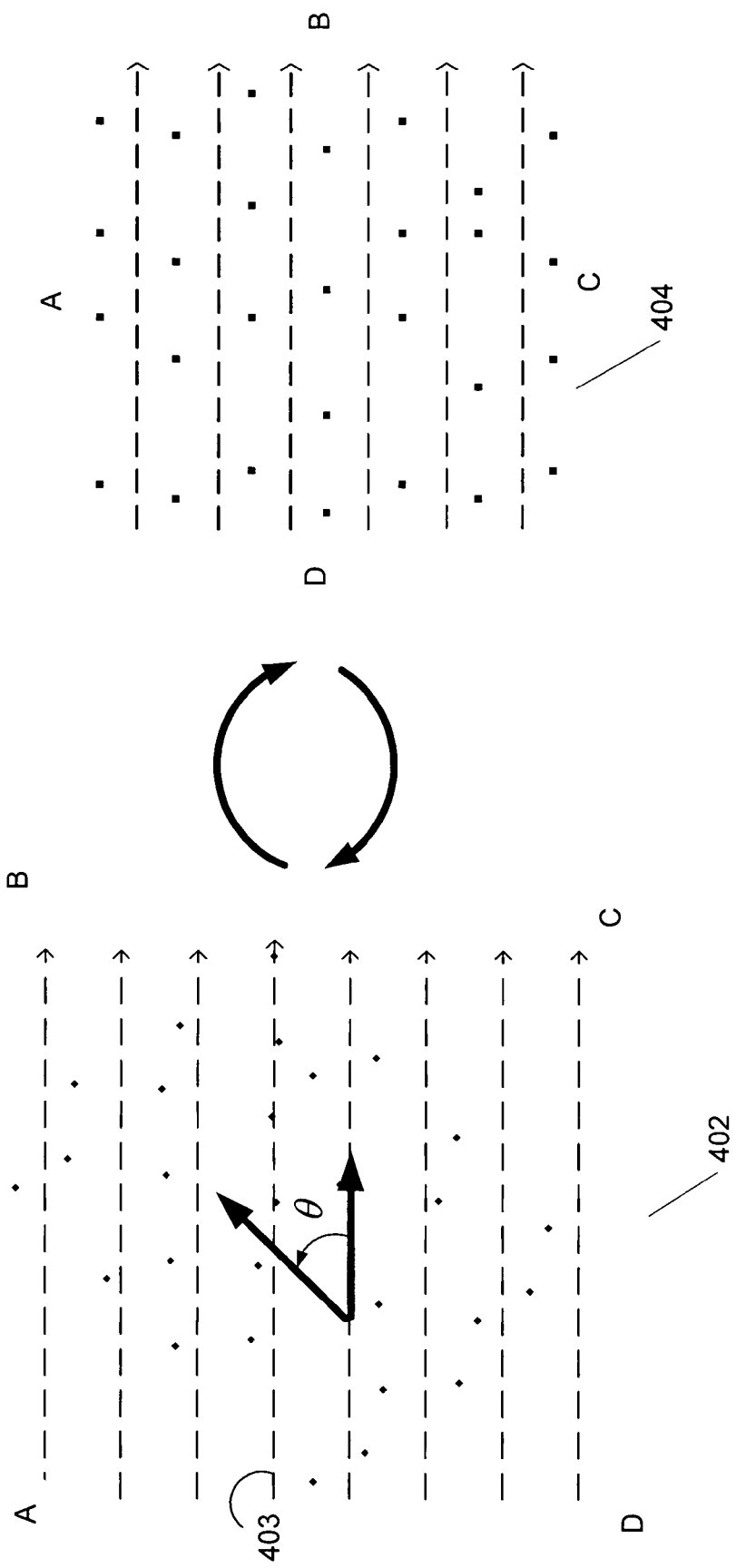

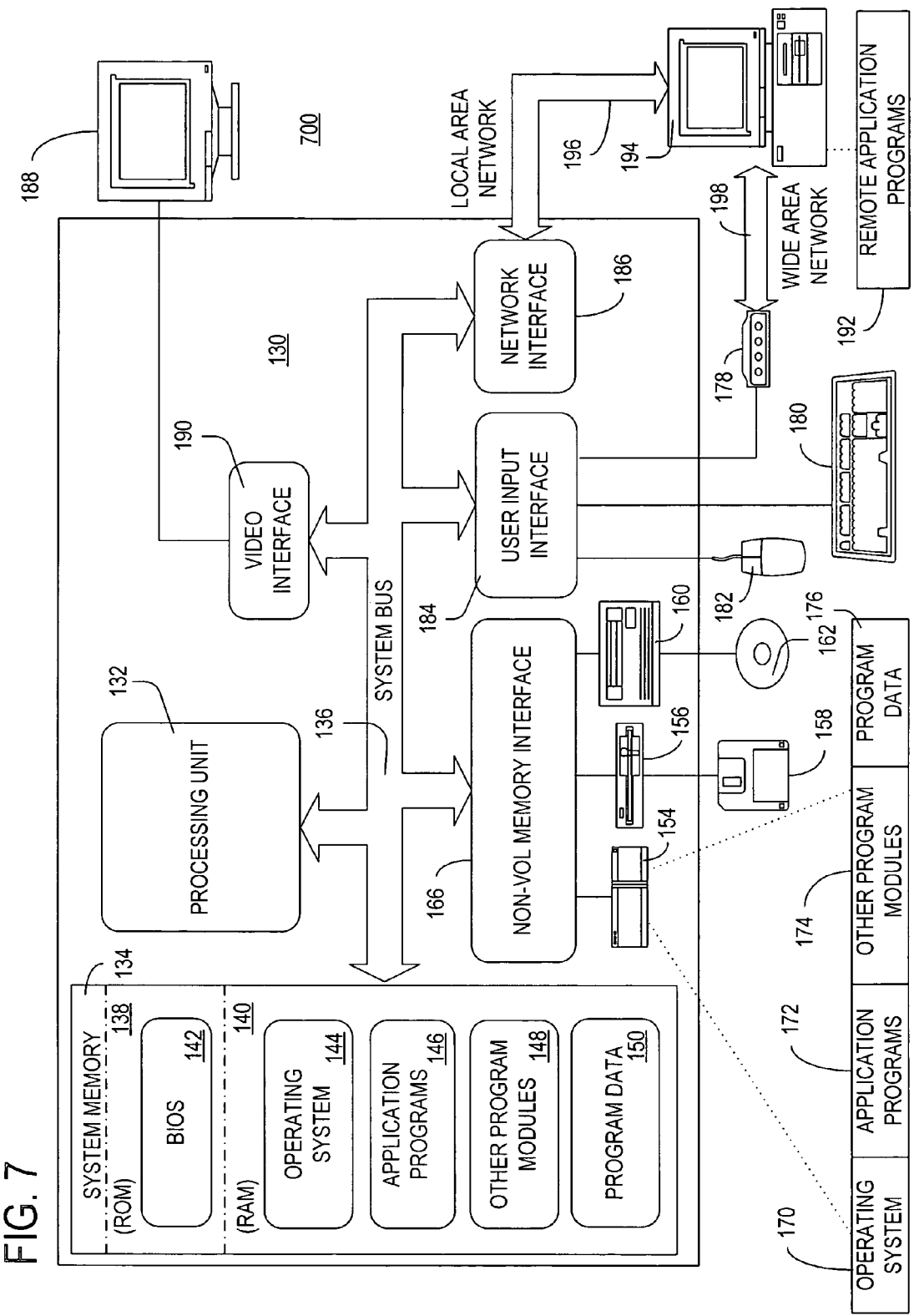

CODED PATTERN FOR AN OPTICAL DEVICE AND A PREPARED SURFACE

TECHNICAL FIELD

Embodiments of the present invention relate to an optical device interacting with a surface to determine encoded information on the surface. In particular, embodiments of this invention relate to such a surface having a pattern, which includes symbols that are based on an ordered sequence of digits divided into windows and that indicate encoded information.

BACKGROUND OF THE INVENTION

Computer users are accustomed to using a mouse or keyboard as a way of interacting with a personal computer. While inputting information via a mouse or keyboard provides a number of advantages, most users continue to perform certain functions by composing a hand-written document (e.g., on paper or on a whiteboard). Some advantages of a hand-written document over an electronic document include its readability and portability. Others include the ease at which one can archive a hand-written document. One of the difficulties, however, with composing a hand-written document is the need to have the hand-written document converted into an electronic form. This requires the original user or another user to manually enter the information written in the document into a personal computer. In some cases, a user will scan in the hand-written document, thereby creating a new electronic document. These multiple steps make the interaction between the original document and the electronic form of the document difficult to handle on a repeated basis. Further, the scanned-in image is frequently non-modifiable. This makes it difficult for users to alter the information in the electronic form.

Similar difficulties also exist in creating an annotation on a preexisting document. When converting the hand-written annotation into an electronic form, users frequently need to manually enter the annotation into a personal computer or scan in the annotation. Since the scanned-in image is frequently non-modifiable, it is difficult to separate the annotation from the original information of the preexisting document. Accordingly, an improved way to convert hand-written information into an electronic form is needed.

Methods and systems have been developed to analyze a pattern encoded on a surface to determine a location of an optical device on the surface. Some existing patterns, however, do not have efficient ink usage. That is, the existing methods and systems often require a significant amount of ink or other means to embed a pattern on a surface. Further, some existing methods and systems do not provide a pattern that is visually smooth enough to effectively prevent users from being distracted by such a pattern when performing a function on a surface encoded with the pattern (e.g., writing on the surface). Also, the existing methods and systems fail to provide a pattern that has variable information density. Thus, the existing methods and systems typically do not allow scaling of ink density according to data desired to be encoded. Additionally, some of the existing patterns are not easy to produce, to decode, and/or to effectively encode a variety of payload data.

Accordingly, a solution that effectively encodes data in a pattern of symbols and decodes a pattern of symbols to determine data corresponding to the pattern is desired to address one or more of these and other disadvantages.

SUMMARY OF THE INVENTION

Embodiments of the invention overcome one or more deficiencies in the prior art by providing, among other things, a system and method for encoding and decoding a pattern of symbols on a surface such as a paper or computer display. The pattern of symbols may represent encoded data such as position data, multimedia (e.g., audio, video, image, etc.), security application, biometrics, identify management, other bulk data, or a link to other data. In one embodiment, the invention uniquely identifies positions relating to the surface. According to one or more embodiments of the invention, an optical device such as a digital pen or stylus advantageously tracks its absolute position on a prepared surface by detecting symbols corresponding to position data encoded on the surface. In one or more other embodiments of the invention, the surface is encoded with symbols indicative of the position data by means of a pattern embedded by a printing process, such as a laser printer or an inkjet printer. A sensor of the optical device may then detect the symbols and decode the data that the pattern of symbols represents. Moreover, the features of embodiments of the present invention described herein are economically feasible, commercially practical, and easier to implement than currently available techniques.

Briefly described, a method employing aspects of the invention encodes data in a pattern of symbols on a surface. The method includes dividing an ordered sequence of digits representative of the encoded data into a plurality of sequential windows. Each of the sequential windows includes a partial sequence of the ordered sequence of digits. The method also includes transforming the partial sequence included in each sequential window into a series of digits. The method further includes arranging a symbol within a plurality of surface windows on the surface. Each surface window corresponds to one of the sequential windows. A position of the symbol within each surface window is based on one of the transformed series of digits. And the position of the symbol within the surface window is indicative of the encoded data.

In another embodiment of the invention, a method employing aspects of the invention decodes a pattern of symbols on a surface to determine data corresponding to the pattern. The pattern is divided into a plurality of windows on the surface. The method includes detecting the symbols on the surface to determine their pattern. The method also includes determining window boundaries for the determined pattern. The window boundaries define at least one of the windows. And each defined window includes at least one of the detected symbols associated therewith. The method further includes determining a position of the detected symbol within the associated window. The determined position of the detected symbol within the associated window indicates the data corresponding to the pattern.

In yet another embodiment of the invention, an article employing aspects of the invention comprises a surface and a pattern on the surface. The pattern has symbols on the surface. And each symbol has a position on the surface based on an ordered sequence of digits representative of encoded data and divided into a plurality of windows. Each window includes at least one of the symbols. And the position of the symbol within the window indicates the encoded data.

In further yet another embodiment of the invention, a system employing aspects of the invention is adapted to encode data in a pattern of symbols on a surface. The system includes a processor configured to execute computer-executable instructions to separate an ordered sequence of digits representative of the encoded data into a plurality of sequential windows. Each of the sequential windows includes a partial sequence of the ordered sequence of digits. The processor is also configured to execute computer-executable instructions to transform the partial sequence included in each sequential window into a series of digits. The system also includes means for arranging a symbol within a plurality of surface windows on the surface. Each surface window corresponds to one of the sequential windows. A position of the symbol within each surface window is based on one of the transformed series of digits. And the position of the symbol within the surface window is indicative of the encoded data.

In further yet another embodiment of the invention, a system employing aspects of the invention is adapted to decode a pattern of symbols on a surface to determine data corresponding to the pattern. The pattern is divided into a plurality of windows on the surface. The system includes a sensor to detect the symbols on the surface to determine their pattern. The system also includes a processor configured to execute computer-executable instructions to determine window boundaries for the determined pattern. The window boundaries define at least one of the windows. And each defined window includes at least one of the detected symbols associated therewith. The processor is also configured to execute computer-executable instructions to identify a position of the detected symbol within the associated window to determine the data corresponding to the pattern.

Computer-readable media having computer-executable instructions for performing methods of encoding and decoding a pattern of symbols on a surface embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

FIG. 2 is a block diagram illustrating an exemplary sequence of digits arranged as a rectangular array/matrix according to one embodiment of the invention.

FIGS. 4A to 4E are diagrams illustrating steps of an exemplary process of decoding a pattern of symbols on a surface according to one embodiment of the invention.

FIG. 7 is a block diagram illustrating an exemplary embodiment of a suitable computing system environment in which an embodiment of the invention may be implemented.

Corresponding reference characters indicate corresponding parts throughout the drawings.

DETAILED DESCRIPTION OF THE INVENTION

Exemplary Optical Device

Embodiments of the present invention relate to an optical device (e.g., an optical imaging sensor or an optical reading device) interacting with a surface to determine encoded information on the surface. In one embodiment of the invention, the optical device may be implemented as a multi-function pen or stylus. Aspects of the present invention also include placing a pattern of symbols in a display form. The pattern of symbols may represent encoded data such as position data, multimedia (e.g., audio, video, image, etc.), security application, biometrics, identify management, other bulk data, or a link to other data. In one embodiment, the display form is a printed paper (or other physical medium) or a display projecting or containing the encoded pattern of symbols in conjunction with another image or set of images. For example, the encoded pattern of symbols may be represented as a physical image on the paper, an image overlying or underlying another displayed image, or a physically encoded pattern (e.g., non-modifiable pattern) combined with or overlaying a display screen (so an image detected by the optical device is locatable on the display screen).

In one embodiment of the invention, the optical device is implemented as an ink pen for writing on a paper. In another embodiment of the invention, the optical device is implemented as a stylus for writing on the surface of a computer display. By repeatedly detecting over a period of time the location of the optical device on the surface, a system may track the movement and position of the optical device associated with writing on the surface. This movement may thus represent "digital ink."

Figure 1A:
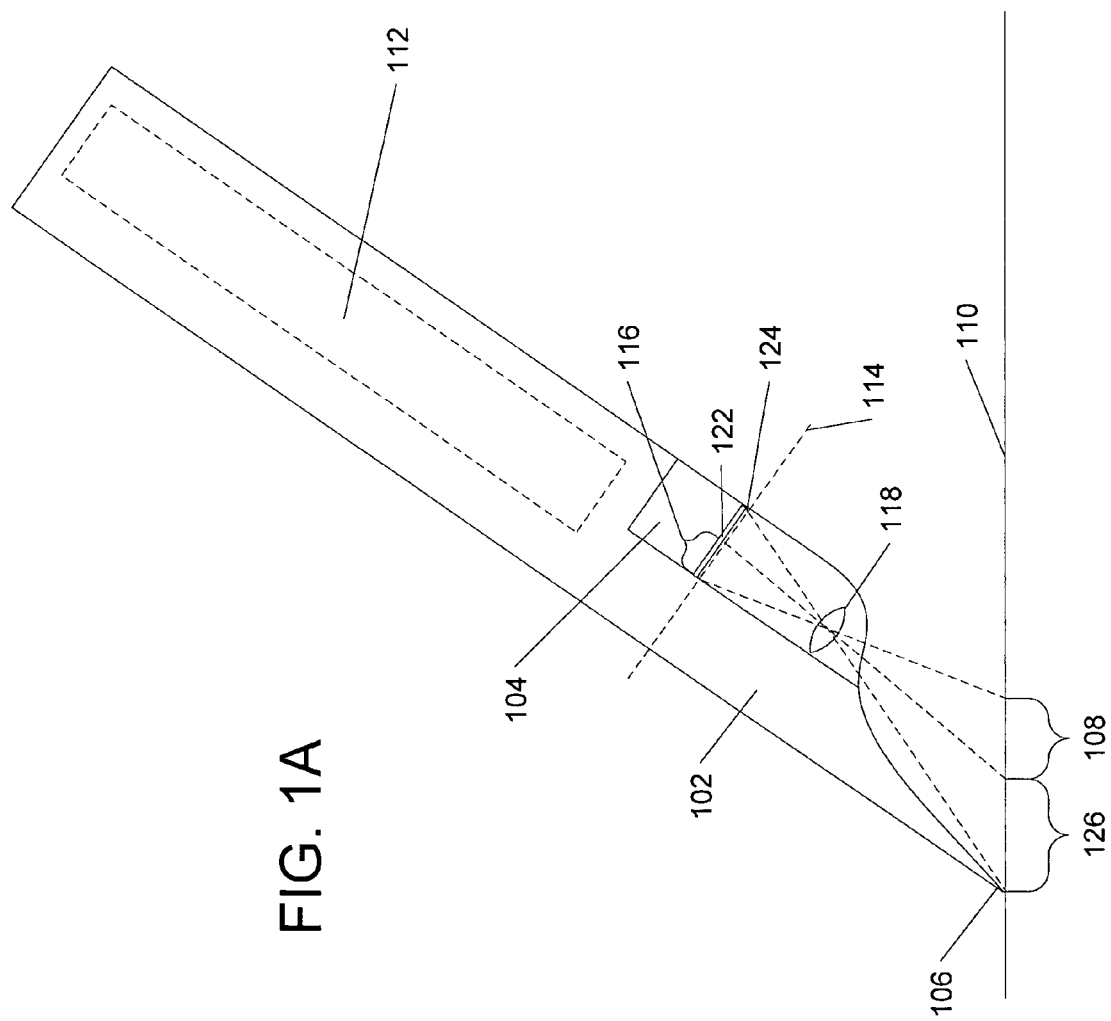
FIG. 1A is a block diagram illustrating an exemplary optical device according to one embodiment of the invention.

FIG. 1A shows an exemplary optical device implemented as a pen 102 with a camera 104 or other detector according to one embodiment of the invention. The pen 102 includes a pen tip 106 that may or may not include an ink reservoir. The camera 104 detects and captures an image from a location 108 of a surface 110. Pen 102 may further include additional sensors and/or processors as represented by broken box 112. These sensors and/or processors 112 include the ability to transmit information relating to the detected image to another pen 102 and/or to another device such as a personal computer, a personal digital assistant (PDA), a phone, etc. (for example, via Bluetooth or other wireless protocols). If pen 102 does not include sensors and/or processors 112, it may transmit information relating to the detected image to another pen 102 and/or to the personal computer via a wire (i.e., no wireless transmitter).

Figure 1B:
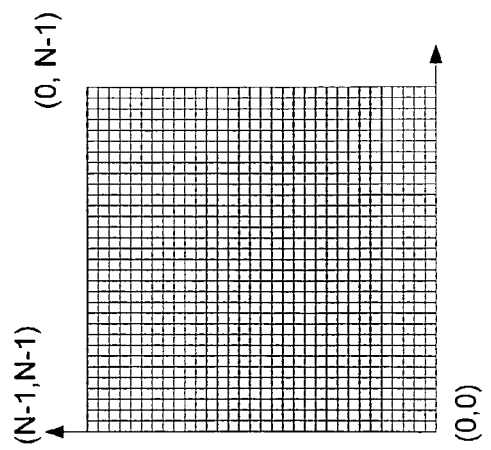
FIG. 1B is a block diagram illustrating a configuration of an exemplary image detected by an optical device according to one embodiment of the invention.

FIG. 1B illustrates a configuration of an exemplary image as viewed by camera 104 according to an embodiment of the invention. In this illustrated image, the field of view of camera 104 is 32×32 pixels (where N=32). Accordingly, FIG. 1B shows a field of view of 32 pixels long by 32 pixels wide. The size of N is specified based on the degree of image resolution desired. Also, while the field of view of camera 104 is shown in FIG. 1B as a square for illustrative purposes, the field of view may include other shapes as well.

The input to pen 102 from camera 104 is defined as a sequence of image frames {Ii}, I=1, 2, . . . , A, where image frame Ii is detected by pen 102 at sampling time ti. The sampling rate may be fixed or variable based on a number of factors, including the size of the pattern of symbols encoded on the surface. The size of the detected image frame may be large or small, depending on factors such as the size of the encoded pattern of symbols and the degree of detection accuracy desired. Also, the camera image size may be determined based on the size of the encoded pattern of symbols to be detected.

The image detected by camera 104 may be used directly by a processing system or may undergo a pre-filtering process. This pre-filtering process may occur in pen 102 or may occur outside of pen 102 (for example, in a personal computer).

The image size of FIG. 1B is 32×32 pixels. If each encoding unit size is 3×3 pixels, then the number of detected encoded units is approximately 100. If the encoding unit size is 5×5 pixels, then the number of detected encoded units is approximately 36.

FIG. 1A also shows an image plane 114 on which an image 116 of the pattern of symbols from location 108 is formed. A lens 118 focuses light received from the pattern of symbols on the surface 110. The lens 118 may be a single lens or a multi-part lens system, but is represented here as a single lens for simplicity. An image-capturing sensor 122 detects and captures the image 116. In one embodiment of the invention, the image-capturing sensor 122 is large enough to detect image 116. Alternatively, image-capturing sensor 122 is large enough to capture an image 124 of the pen tip 106 at a location 126. For reference, the image 124 at the location 126 is referred to as a virtual pen tip. It is noted that the virtual pen tip location with respect to image-capturing sensor 122 is fixed because of the constant relationship between pen tip 106, lens 118, and image-capturing sensor 122. Based on the transformation from the location of the virtual pen tip (represented by $L_{virtual-pentip}$) to the location of the real pen tip (represented by $L_{pentip}$), the location of the real pen tip in relation to the detected image 116 may be determined.

The following transformation $F_{s \to p}$ transforms the image detected by the camera to the real image on the surface:

$$L_{surface} = F_{s \to p}(L_{sensor})$$

When writing on the surface, the pen tip and the surface are on the same plane. Accordingly, the transformation from the virtual pen tip to the real pen tip is also $F_{s \to p}$:

$$L_{pentip} = F_{s \to p}(L_{virtual-pentip})$$

The transformation $F_{s \to p}$ is referred to as a perspective transformation. Accordingly, $F_{s \to p}$ is estimated as:

$$F'_{s \to p} = \begin{Bmatrix} s_x \cos\theta, & s_y \sin\theta, & 0 \\ -s_x \sin\theta, & s_y \cos\theta, & 0 \\ 0, & 0, & 1 \end{Bmatrix}$$

In this equation, $\theta$ is the rotation of the pattern detected at location 108, while $s_x$ and $s_y$ are the scales of two rotational orientations of the detected pattern. Further, $F'_{s \to p}$ is refined to $F_{s \to p}$ by matching the detected image with the corresponding background image on the surface. That is, a more precise perspective matrix $F_{s \to p}$ (8 parameters) is obtained by a kind of optimization algorithm referred to as a recursive method. The recursive method treats the matrix $F'_{s \to p}$ as the initial value. $F_{s \to p}$ describes the transformation between S and P more precisely than $F'_{s \to p}$.

To determine the location of the virtual pen tip by calibration, a user places pen tip 106 on a known location $L_{pentip}$ of the surface. The user then tilts pen 102, allowing camera 104 to detect a series of images with different pen poses. For each image detected, the transform $F_{s \to p}$ is received. From this transform, the location of virtual pen tip 106 (i.e., $L_{virtual-pentip}$) may be obtained:

$$L_{virtual-pentip} = F_{p \to s}(L_{pentip})$$

And, $$F_{p \to s} = [F_{s \to p}]^{-1}$$

By averaging the $L_{virtual-pentip}$ received from the images, an accurate location of virtual pen tip 106 (i.e., $L_{virtual-pentip}$) may be determined.

Since the location of virtual pen tip 106 is now known, the transformation $F_{s \to p}$ may be obtained from the image detected. This information is then used to determine the location of real pen tip 106 (i.e., $L_{pentip}$):

$$L_{pentip} = F_{s \to p}(L_{virtual-pentip})$$

Pattern Encoding

Data to be encoded as a pattern of symbols on a surface may be represented as a sequence of digits such as a sequence of binary digits {0, 1}. Various types of bit streams may be used as this sequence of digits. For example, a random or pseudo-random sequence of digits may be used. This random or pseudo-random sequence has a property such that if a window (e.g., a sequential window) of width m is slid along the sequence $S_m$, each of the $2^m-1$ nonzero m-tuples is seen once. In other words, the sequence of digits would have a characteristic such that a location in the sequence of digits of a partial sequence of a predetermined length is unambiguously determined. In one embodiment of the invention, the data encoded as a pattern of symbols is distributed across the surface in a way that utilizes the geometry of the surface. For example, the sequence of digits may be arranged as a rectangular matrix or array for encoding on a rectangular surface. FIG. 2 illustrates an exemplary rectangular array/matrix of digits according to an embodiment of the invention.

The rectangular array/matrix illustrated in FIG. 2 may be arranged in rows, in columns, diagonally, or following any other formulaic ordering. For example, the array/matrix of FIG. 2 may be formed by the following bit stream if proceeding from left to right then down:

0100 0111 0111 0100 1000 1110 0111 0100 1100

The array/matrix of FIG. 2 may be formed by the following bit stream if proceeding from top to bottom then right:

0101 1100 0111 0010 0110 1001 1001 1110 0010

In another example, the array/matrix of FIG. 2 may be formed by the following bit stream if the bit stream is ordered and wrapped diagonally:

0110 0000 0101 0101 1000 0011 1111 1010 1110

Instead of arranging the sequence of digits into a rectangular array/matrix, the sequence may also be arranged as a close-packed circle or any other plane-filling functions. If the sequence of digits is distributed across the surface as a rectangular array/matrix, this sequence may be considered as an ordered sequence of rows and columns. One embodiment of the invention relates to a method of encoding and decoding the rectangular array/matrix of digits as a pattern of symbols on the surface. But embodiments of the invention are applicable to digits arranged as any other plane-filling functions.

Figure 3A:
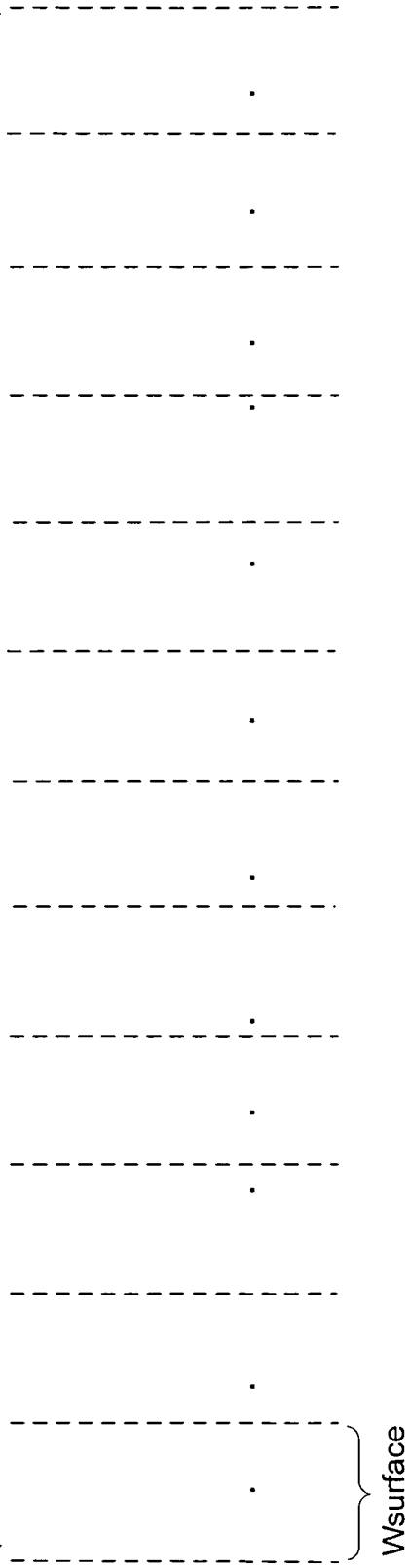
FIGS. 3A to 3C are diagrams illustrating steps of an exemplary process of encoding a sequence of digits into a pattern of symbols on a surface according to one embodiment of the invention.

According to one embodiment of the invention, a row of digits of length n may be divided into m non-overlapping sequential windows (Wseq) of length k (which is modifiable based on the size and resolution of an image-capturing system) if n is divisible by k (i.e., n mod k=0). Therefore, for an exemplary row of digits of a particular rectangular array/matrix (or other plane-filling functions):

100110001101111110100010000101100101 if k=3 and m=12, then the non-overlapping sequential windows would be:

100 | 110 | 001 | 101 | 111 | 110 | 100 | 010 | 000 | 101 | 100 | 101 which is also illustrated in FIG. 3A.

Let X be the set of m non-overlapping sequential windows of length k. That is, $X=(x_0, x_1, \ldots, x_{n-1})$. Thus, for the exemplary row of digits shown above, the following set X is formed:

(100, 110, 001, 101, 111, 110, 100, 010, 000, 101, 100, 101)

or in another number system such as in decimal form:

(4, 6, 1, 5, 7, 6, 4, 2, 0, 5, 4, 5)

Let Y be the set of m values, $(y_0, y_1, \ldots, Y_{n-1})$, where $y_i=2^{xi}$, $0 \leq i \leq m$, and $x_i$ is the ith element of the set X. Thus, the following set Y is formed for the set X shown above:

$(2^4, 2^6, 2^1, 2^5, 2^7, 2^6, 2^4, 2^2, 2^0, 2^5, 2^4, 2^5)$ or in another number system such as in binary form:

(00010000, 01000000, 00000010, 00100000, 10000000, 01000000, 00010000, 00000100, 00000001, 00100000, 00010000, 00100000)

In one embodiment of the invention, the Y set (for example, in binary form) is represented visually as a $1\times(2^k m)$ array/matrix of symbols (or pixels) within one or more surface windows (Wsurface) on a surface to form a pattern. An exemplary array/matrix of symbols corresponding to the exemplary Y set shown above is illustrated in FIG. 3A. Particularly, a symbol such as a dot is arranged within each of the m non-overlapping surface windows across the surface. Each symbol is positioned within its associated surface window on the surface based on the position of a selected digit type within each element of the Y set. Thus, for a Y set in binary form, each symbol is positioned within its associated surface window based on the position of the binary digit "1" within each element of the Y set. For example, the digit "1" is located at the fourth position from the left in the element 00010000 of the Y set shown above. Accordingly, the symbol is arranged to locate within the associated surface window on the surface at the fourth position from the left. It is noted that this pattern of symbols thus comprises one or more of "virtual" window boundaries to establish the non-overlapping and equally sized surface windows. And the positions or locations of the symbols within their associated surface windows on the surface (e.g., the positions of two symbols within two adjacent surface windows) are indicative of data such as a unique position on the surface. The entire pattern of symbols on the surface thus encodes a plurality of positions relating to the surface. Further, it is appreciated that that any color may be used to represent each symbol. Also, the symbol may be of any kind of shape. In an embodiment of the invention, the color and the shape of the symbol provide a contrast with the background of the surface to be differentiated by an image-capturing system.

Figure 3B:
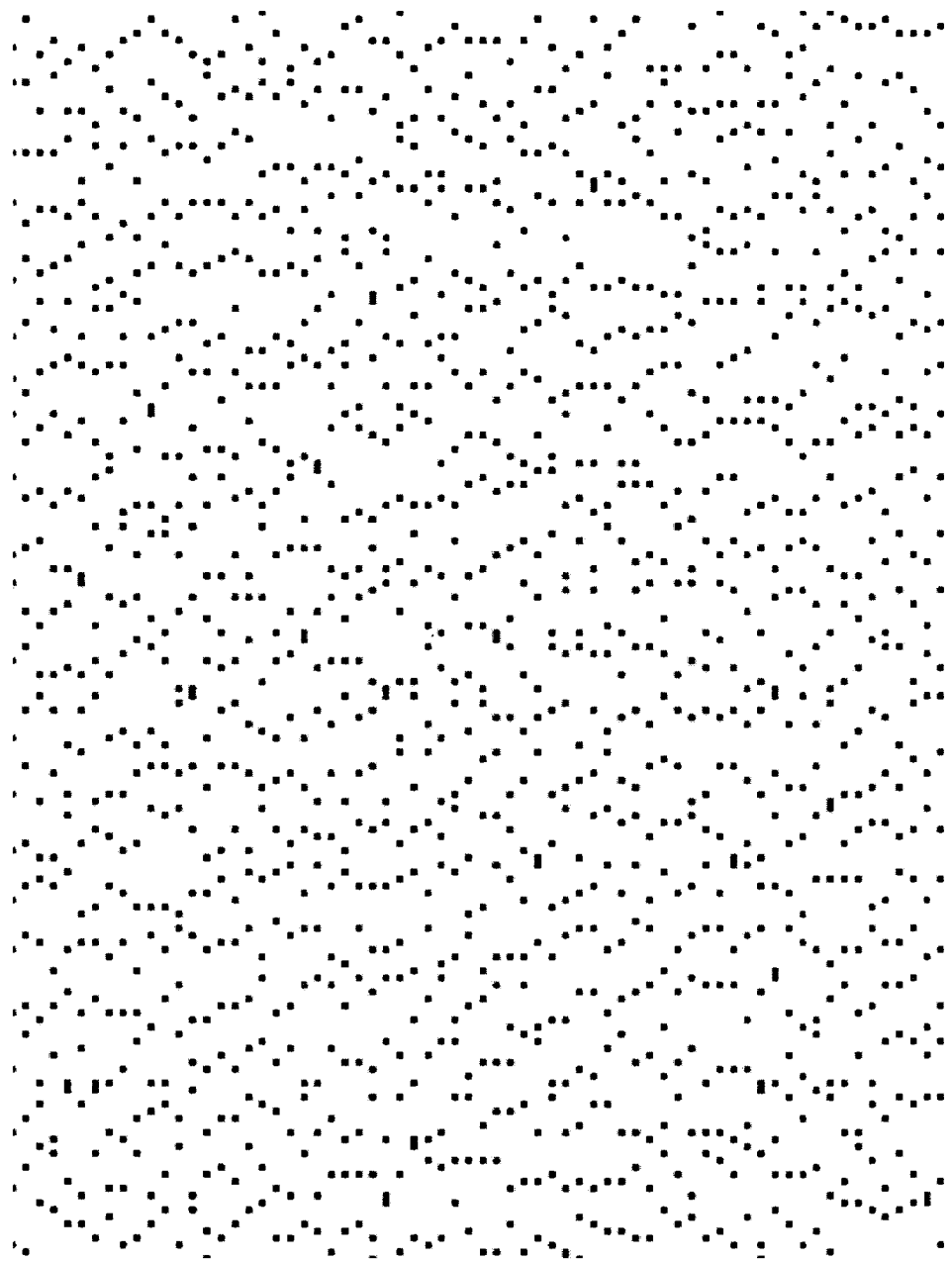
Figure 3C:
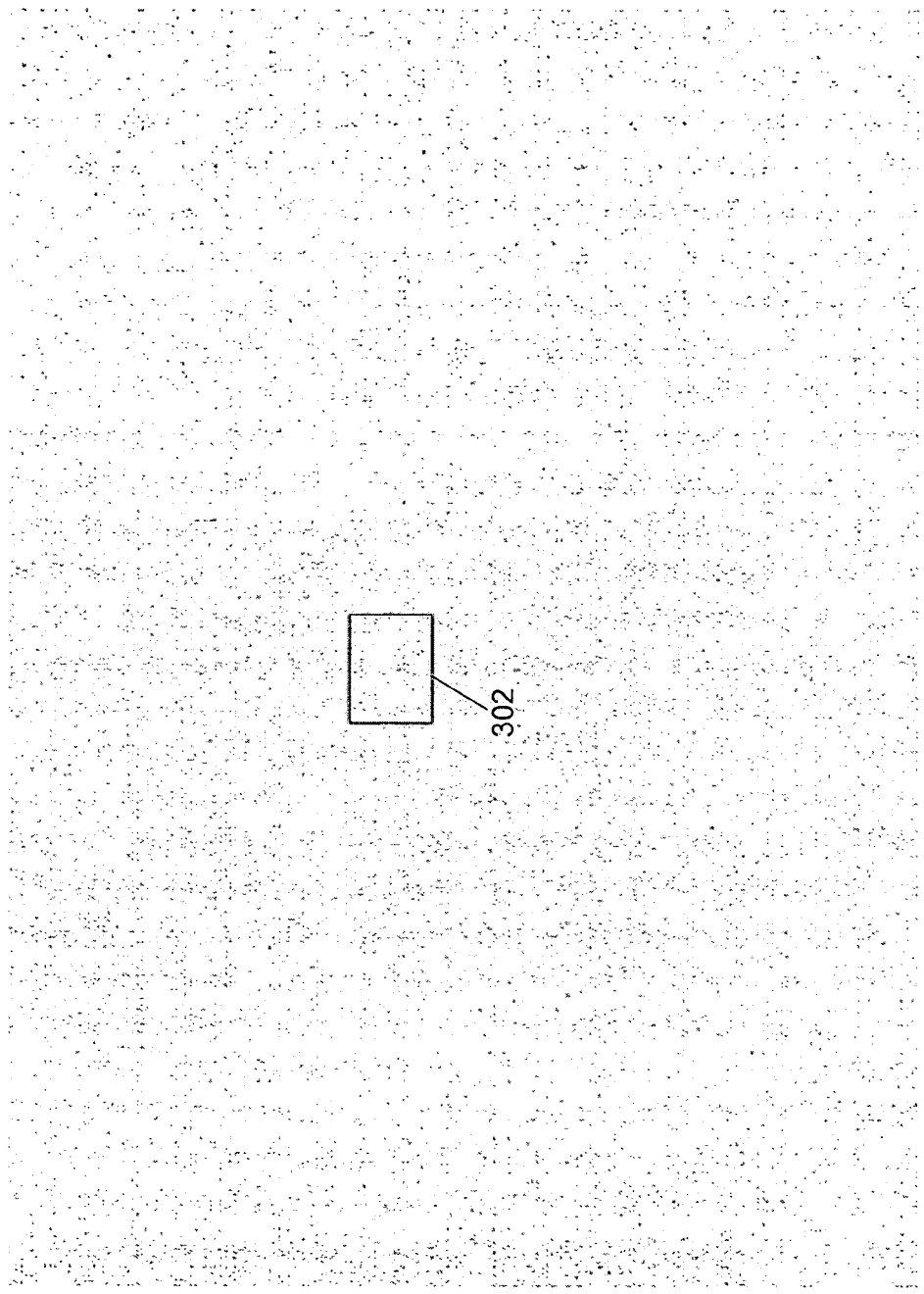

FIG. 3B illustrates an exemplary pattern of symbols formed by a sequence of vectors that represents the original sequence of rows in a particular rectangular array/matrix. FIG. 3C further illustrates another exemplary pattern of symbols formed by a sequence of vectors that has a higher information content or entropy than that of FIG. 3B. The pattern within box 302 of FIG. 3C corresponds to the pattern of symbols illustrated in FIG. 3B but with a lower resolution. As can be seen in FIG. 3C, if the data encoded as the pattern of symbols has high information content or entropy, then the pattern of symbols on the surface has no perceptible structure and appears as background noise to a human observer. If black symbols (or pixels) are used against a white surface background, then the average color intensity of the background may be 12.5%, which is reasonably legible to an observer. In one embodiment of the invention, the surface background may be lightened by adding spaces between successive rows of symbols on the surface, at a proportional cost to encoding density. The size of the symbols may also be reduced to decrease the pattern contrast against the surface background, at the expense of less robust image processing.

Pattern Decoding

Figure 4A:
Figure 4B:
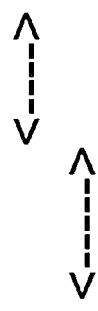

While the patterns of symbols shown in FIGS. 3B and 3C appear random to a human observer, a decoding system knows that it was not generated by a random process. If a pattern of symbols was encoded with the above process with k=3 and m=6, then each row of symbols on the surface may be partitioned into m non-overlapping surface windows of size $2^k$. For example, if the Y set is in binary form, each of the m non-overlapping surface windows includes one colored symbol (or pixel) since binary numbers of the form $2^n$ have one digit having a value of "1", with the remaining digits having a value of "0". A helpful case includes two colored symbols found to be closer than $2^k$ positions apart on the surface. In this case, the shared surface window boundary occurs in a relatively few possible locations between them on the surface, as shown in FIG. 4A. But a single surface window boundary may occur between two colored symbols even if the two symbols are more than $2^k$ positions apart from each other. Further, each successive potential surface window boundary on the surface tends to limit the possible range or location of other potential surface window boundaries on the surface, as shown in FIG. 4B. In FIG. 4B, the space within the bracket < > represents the possible range of a potential surface window boundary, while the sign | represents an established surface window boundary.

Figure 4C:
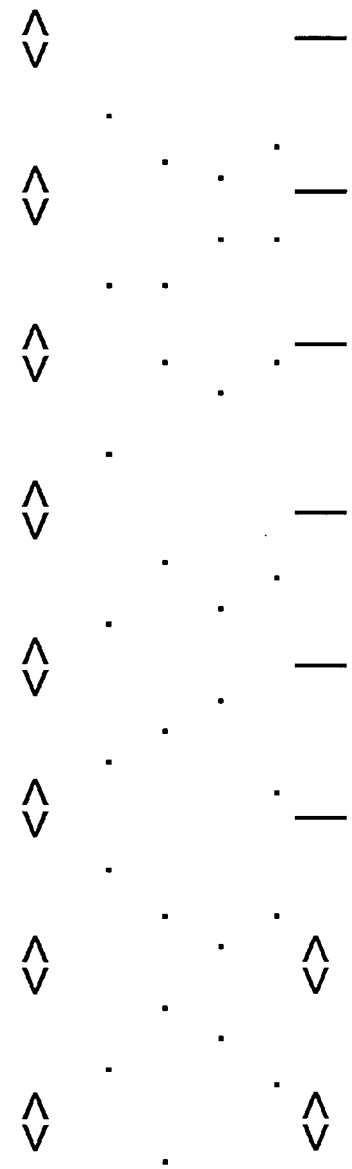

As successive rows of symbols on the surface are detected, the possible location of a potential surface window boundary on the surface converges to a few choices. And given enough rows of symbols on the surface, a unique choice for the location of the surface window boundary on the surface emerges, as shown in FIG. 4C.

FIG. 4D shows that if at least one unique surface window boundary on the surface is determined, then the data values represented by the pattern of symbols may be decoded. Particularly, after the position of at least one symbol within an associated surface window is known, a number series (for example, a binary series) having a length of $2^k$ can be determined. This number series has one selected digit type (for example, the binary digit "1") located at a position that corresponds to the position of the symbol within the associated surface window, with the remaining digits having another digit type (e.g., the binary digit "0"). Based on this determined number series, a partial sequence of the original ordered sequence of digits used to encode the pattern of symbols on the surface may be determined by reversing the encoding process described above. In one example, for a determined number series of 0000010, the y value (in the Y set) would be $2^1$. Thus, if the if the X set is in decimal form, the corresponding x value would be 1. Transforming this x value into another number system such as in binary form, a partial sequence such as 001 may be determined. By repeating this process for other established surface windows on the surface, the pattern of symbols may be decoded to determine the original ordered sequence of digits (e.g., arranged as a rectangular array/matrix).

In certain situations, surface window boundaries may be ambiguous given the area on the surface that is encoded with the pattern of symbols. If this is the case, then it is possible to disambiguate the surface window boundaries based on the known meaning of the data encoded as the pattern of symbols on the surface. For example, if the pattern of symbols represents a plurality of absolute positions on the surface, then adjacent decoded values of the pattern of symbols would represent adjacent positions on the surface. If the decoded values do not represent adjacent positions, then at least one of the potential surface window boundaries is probably incorrect, and the next possible position of this potential surface window boundary may be evaluated. This process can be repeated until the correct position of the potential surface window boundary is found. Alternatively, a history of the recent trajectory of an optical device may be stored in a memory area. Although the pattern of symbols on the surface allows direct and random decoding, many applications of the optical device, such as a pen or stylus, have characteristic movements that may be used to predict the likely current position of the optical device given the history of the device's recent positions on the surface.

In other situations, the optical device may not be aligned with the rectangular axes of the surface (for example, when a user uses the device to write an annotation on the surface). The user may hold the optical device such that the device is rotated relative to the coordinate axes of the surface. These situations may be compensated for by using the continuous spaces between successive rows of symbols on the surface as a mask function. A sampled image of the pattern of symbols at a given position on the surface may then be rotated around the center of the sampled image until the space mask is free of data encoding symbols. Thereafter, the sampled image will be in the correct angular alignment for the decoding process to decode the pattern of symbols on the surface.

FIG. 4E illustrates rotation of a detected image portion in accordance with one embodiment of the invention. An image 402 detected by an image-capturing system may be analyzed to determine its rotational orientation so a decoding system may interpret the data actually represented by the image 402. As can be seen in FIG. 4E, some of the mask functions (e.g., represented by the dashed arrows) of image 402, include data encoding symbols (e.g., dashed arrow 403 overlaps some symbols). Accordingly, image 402 is analyzed to determine the angle θ to rotate image 402 so that the mask functions do not include data encoding symbols. After image 402 is rotated by the angle θ, an image 404 is established, which is in the correct angular orientation and is aligned with the axes of the surface.

According to one embodiment of the invention, after this orientation adjustment is made, the image 404 is output and correlated with the original sequence of digits used to create the pattern of symbols. The correlation may be performed in different ways. For example, it may be performed by a recursive approach in which a recovered partial sequence is compared against other partial sequences within the original sequence of digits. Further, a statistical analysis may be performed between the recovered partial sequence and the original sequence of digits, for example, by using a hamming distance between the two sequences. It is appreciated that a variety of approaches may be used to determine the location of the recovered partial sequence within the original sequence of digits.

Location Determination

Figure 5:
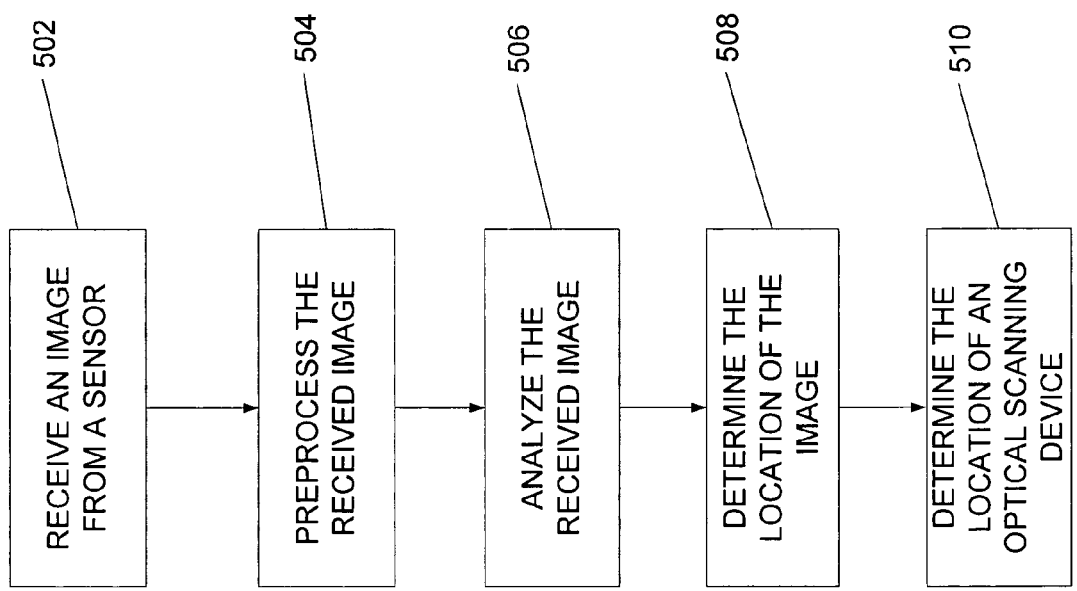
FIG. 5 is an exemplary flow diagram illustrating process flow for determining the location of a detected image according to one embodiment of the invention.

FIG. 5 shows an exemplary process for determining the location of an optical device according to one embodiment of the invention. The input is an image detected by the optical device and the output may be a position coordinate of the image detected compared with the total image. Also, the output may include a rotation angle of the detected image.

At 502, an image is detected and received from a sensor (e.g., a camera) of the optical device. The received image may then be optionally preprocessed at 504 to adjust the contrast between the symbols (or pixels) and the surface, in an attempt to determine the rotation angle θ of the detected image, and the like.

At 506, the received image is analyzed to determine the sequence of digits represented by the image. Particularly, based on a known length of each "virtual" surface window on the surface, a potential surface window boundary located between two symbols that are positioned for at most the known length apart on the surface may be determined. Based on this potential surface window boundary, other potential surface window boundaries across a first direction of the received image may be incrementally identified. Further, surface window boundaries across a second direction of the received image may be incrementally established. After the surface window boundaries are established, a number series may be determined as a function of the position of a symbol within an established surface window on the surface. This number series may then be decoded to obtain a partial sequence of the original ordered sequence of digits used to encode the pattern of symbols on the surface.

At 508, the obtained partial sequence is compared against the original sequence of digits, and the location of the obtained partial sequence within the original sequence of digits is determined. This comparison may be made when the system is aware of how the original sequence of digits is ordered and encoded to create the pattern of symbols on the surface (e.g., as shown in FIG. 3B). After the location of the detected image is determined at 508, the location of the optical device may be determined at 510.

Data Stream Encoding

Figure 6:
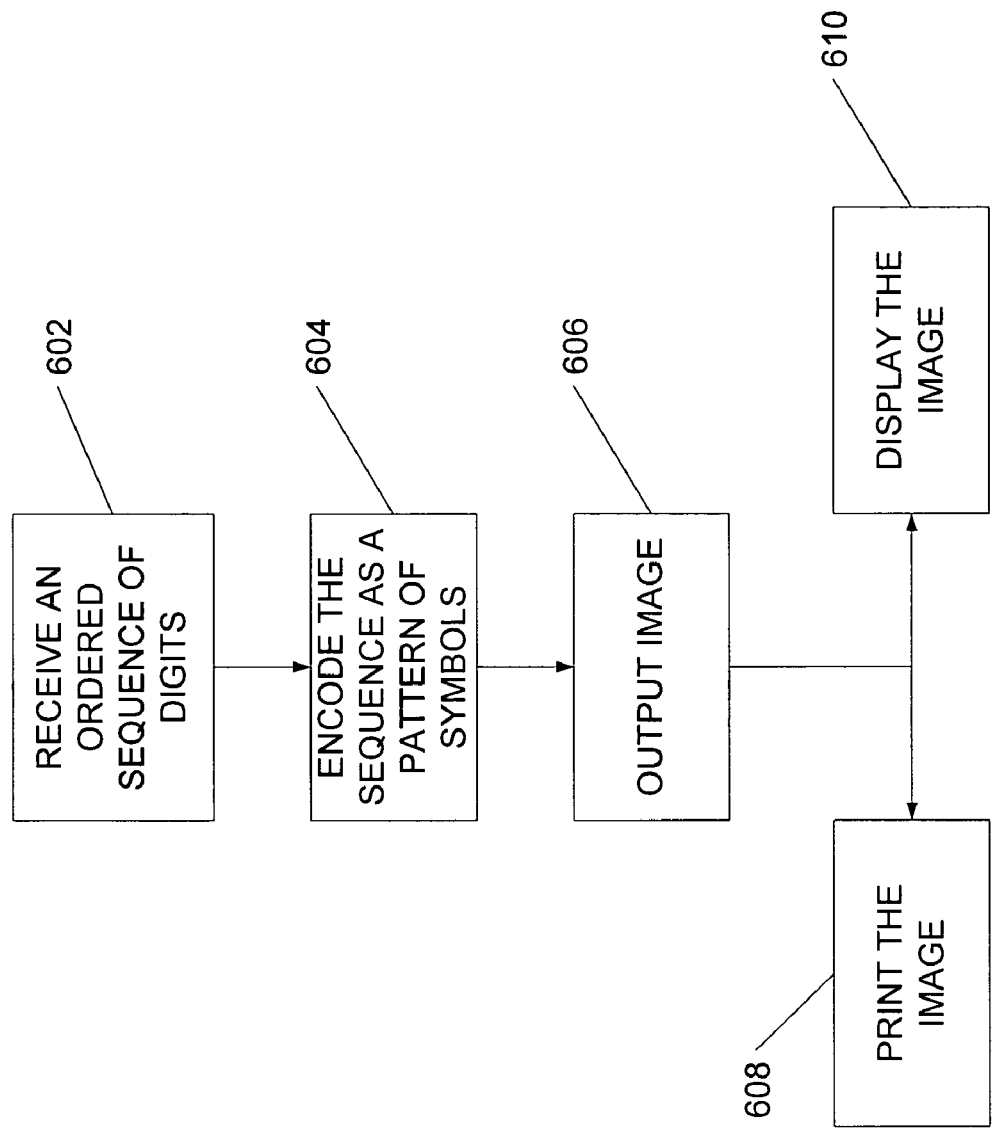
FIG. 6 is an exemplary flow diagram illustrating process flow for encoding an ordered sequence of digits according to one embodiment of the invention.

FIG. 6 shows an exemplary process for encoding an ordered sequence of digits such an ordered sequence of binary digits. At 602, an ordered sequence of digits is defined or received by a processor. At 604, the ordered sequence of digits is encoded as a pattern of symbols. In particular, the ordered sequence of digits is divided into one or more sequential windows (e.g., based on the geometric shape of the surface), where each sequential window includes a partial sequence of the ordered sequence of digits. This partial sequence is transformed into another number system (e.g., octal, decimal, hexadecimal, etc.). For instance, the partial sequence may be represented as a decimal digit. A mathematical function is then applied to the transformed partial sequence. In one embodiment of the invention, if the partial sequence is represented as a decimal digit, the mathematical function includes powering a predetermined number (e.g., 2) by the value of the decimal digit. The decimal digit that has been applied the mathematical function is then transformed into another number system such as a binary representation of a predetermined length. Then, a symbol (e.g., a dot or pixel) is arranged within one or more surface windows on the surface based on a position of a selected digit type (e.g., the binary digit "1") within the length of the binary representation. Each surface window on the surface corresponds to one of the sequential windows. The position of the symbol within the corresponding surface window on the surface thus indicates data (e.g., a unique position on a surface).

At 606, the processor outputs an image comprising a pattern of symbols that is created from the ordered sequence of digits. The output may then be optionally printed on a medium such as a paper at 608 or may be optionally displayed on a display at 610. To be associated with a medium to be printed at 608, the output image may be rendered in graphical form and sent to a printer (e.g., a laser printer or an inkjet printer) as an image to be printed, underlaid, or overlaid onto another image or document content. Similarly, the output image may be combined with other information and rendered for display at 610. The process of associating the rendered form of the output image with other content may generally be referred to as watermarking. For instance, the image may be displayed as a watermark on the display or may be embedded into the display itself (for example, during the forming process of the display or applied later as a layer that is visually transparent to humans but is detectable by an optical device (e.g., via infrared wavelengths)). In one embodiment of the invention, the printer and the display (or other techniques for rendering the output image) constitute means for arranging a symbol within a surface window on a surface.

Applications

The pattern of symbols described herein may be used in a number of ways. In one embodiment of the invention, the pattern of symbols is incorporated into a printed paper as an image combined with an existing image or as an image printed on the paper. The image representing the pattern of symbols may be printed on a blank sheet of paper or may be printed on a sheet that already includes other information (for example, a spreadsheet). The process for adding the image with the embedded information includes watermarking a document or page. This may further include embedding a watermark onto an image, printing a paper with the embedded watermark, combining and printing the watermark with another image, and various combinations thereof. For example, a pattern of symbols may be printed on the background of a paper document that includes text and graphics for interpretation by a human reader. This pattern of symbols, however, does not degrade the readability of the document and may be produced by a printer using a small amount of printer ink.

In another embodiment of the invention, the image representing the pattern of symbols is incorporated within a transparent sheet laid over the display screen of a device or system or is incorporated within a surface that is used in combination with a display, including protective films. In one example, the pattern of symbols is embedded into a liquid crystal display (LCD). Each pixel pitch of the LCD has its frame, and the frames of the whole LCD pixels are pieced together to form a grid. Embodiments of the present invention permit the addition of the pattern of symbols onto the grid. For example, a film that includes the pattern of symbols may be applied to the grid. This film may be adjusted to provide the pattern of symbols in visible light. Alternatively, the film may selectively absorb infrared (IR) light or may fluoresce under certain light wavelengths. Further, the LCD may be controlled to emit or absorb light to project the pattern of symbols to a pen or camera. The pattern of symbols may also be applied to the LCD cover glass or cover material.

In another example, an IR reflective film having a pattern of symbols encoded thereon and with a specific spectrum such as 800–900 nm is placed on the LCD grid. An optical device with an IR light-emitting diode (IR LED) and camera (which may have an IR filter) detects an IR image as the optical device moves across the LCD surface. In this instance, the encoded pattern of symbols on the LCD grid reflects the specific IR light, such as 800–900 nm. So the pattern of symbols in the IR image is distinguished from other areas of the film. The IR image can be processed and decoded to determine the location of the optical device. The IR film allows unobstructed transmission of the displayed image.

The size of a pattern of symbols may be selected according to lens design parameters and resolution requirements. For example, to achieve a 0.213 mm×0.213 mm pixel pitch and 5 mm×5 mm lens field of view of the camera, the pattern size may be set to 2×2 pixels.

The pattern of symbols may also be embodied in the display of a laptop, tablet/stylus-based input computer, personal digital assistant, telephone, or any other device.

Another application of the pattern of symbols includes associating a document identifier with a document. Commonly, a user may print a document's title or reference number on the document. In one embodiment of the invention, the pattern of symbols encoded on the document may represent the document's reference number or other information (generally referred to as a document identifier): The user may then detect an image that includes the pattern of symbols on the document, decode the detected image to obtain the document identifier represented by the pattern of symbols, and associate an annotation written on the document with the obtained document identifier. The document identifier may also be a link or a reference to a document in a remote location, which may be accessed via a computer network.

Exemplary Operating Environment

FIG. 7 shows one example of a general purpose computing device in the form of a computer 130. In one embodiment of the invention, a computer such as the computer 130 may be suitable for use in an optical device such as pen 102 or in other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, pens, mice, keyboards, phones, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those described herein to encode data in a pattern of symbols on a surface. Computer-executable instructions are adapted to divide an ordered sequence of digits representative of the encoded data into a plurality of sequential windows. Each of the sequential windows includes a partial sequence of the ordered sequence of digits. Computer-executable instructions are also adapted to transform the partial sequence included in each sequential window into a series of digits. Computer-executable instructions are further adapted to arrange a symbol within a plurality of surface windows on the surface. Each surface window corresponds to one of the sequential windows. A position of the symbol within each surface window is based on one of the transformed series of digits. And the position of the symbol within the surface window is indicative of the encoded data.

Computer 130 also executes computer-executable instructions such as those described herein to decode a pattern of symbols on a surface to determine data corresponding to the pattern. The pattern is divided into a plurality of windows on the surface. Computer-executable instructions are adapted to detect the symbols on the surface to determine their pattern. Computer executable instructions are also adapted to determine window boundaries for the determined pattern. The window boundaries define at least one of the windows. And each defined window includes at least one of the detected symbols associated therewith. Computer-executable instructions are further adapted to determine a position of the detected symbol within the associated window. The determined position of the detected symbol within the associated window indicates the data corresponding to the pattern.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of encoding data in a pattern of symbols on a surface said method comprising:
    dividing an ordered sequence of binary digits representative of the encoded data into a plurality of sequential windows, wherein each of the sequential windows includes a partial sequence of the ordered sequence of digits;
    transforming the partial sequence included in each sequential window into a series of digits, wherein said transforming comprises:
        representing the partial sequence included in each sequential window as a decimal digit,
        applying a mathematical function to the decimal digit, wherein said applying the mathematical function to the decimal digit comprises applying a predetermined number to a power of a value of the decimal digit,
        transforming the decimal digit that has been applied with the mathematical function into a binary representation, and
        wherein the binary representation indicates the series of digits; and
    arranging a symbol within a plurality of surface windows on the surface, wherein each surface window corresponds to one of the sequential windows, wherein a position of the symbol within each surface window is based on one of the transformed series of digits, and wherein the position of the symbol within the surface window is indicative of the encoded data.

2. The method of claim 1, wherein the encoded data indicates a unique position on the surface so that the position of the symbol within each surface window indicates the unique position on the surface.

3. The method of claim 1, wherein said dividing the ordered sequence of digits comprises dividing the ordered sequence of digits into a plurality of non-overlapping and equally sized sequential windows.

4. The method of claim 1, wherein the predetermined number is 2.

5. The method of claim 1, wherein said transforming the decimal digit comprises transforming the decimal digit that has been applied the mathematical function into the binary representation having a predetermined length, and wherein said arranging the symbol within the surface windows on the surface comprises determining a position of a selected binary digit type within the length of the binary representation and arranging the symbol within the surface windows based on the determined position of the selected binary digit type.

6. The method of claim 5, wherein the selected binary digit type is "1".

7. The method of claim 1, further comprising arranging the ordered sequence of digits as a function of a geometric shape of the surface, and wherein said dividing the ordered sequence of digits comprises dividing the ordered sequence of digits into the plurality of sequential windows based on the geometric shape of the surface.

8. The method of claim 7, wherein the geometric shape of the surface is rectangular, and wherein said arranging the ordered sequence of digits comprises arranging the ordered sequence of digits as a rectangular array.

9. The method of claim 1, wherein the ordered sequence of digits has a characteristic such that a location in the ordered sequence of digits of each partial sequence of a predetermined length is unambiguously determined.

10. The method of claim 1, wherein one or more computer-readable media have computer-executable instructions for performing the method recited in claim 1.

11. A system for encoding data in a pattern of symbols on a surface, said system comprising:
  a processor configured to execute computer-executable instructions to:
    separate an ordered sequence of binary digits representative of the encoded data into a plurality of sequential windows, wherein each of the sequential windows includes a partial sequence of the ordered sequence of digits, and
    transforming the partial sequence included in each sequential window into a series of digits, wherein the computer-executable instructions to transform the partial sequence included in each sequential window comprise computer-executable instructions to:
      represent the partial sequence included in each as sequential window as a decimal digit,
      apply a mathematical function to the decimal digit, wherein said computer-executable instructions to apply the mathematical function comprise computer-executable instructions to apply a predetermined number to a power of a value of the decimal digit,
      convert the decimal digit that has been applied with the mathematical function into a binary representation, and
      wherein the binary representation constitutes the series of digits; and
  means for arranging a symbol within a plurality of surface windows on the surface, wherein each surface window corresponds to one of the sequential windows, wherein a position of the symbol within each surface window is based on one of the transformed series of digits, and wherein the position of the symbol within the surface window is indicative of the encoded data.

12. The system of claim 11, wherein the encoded data indicates a unique position on the surface so that the position of the symbol within each surface window indicates the unique position on the surface.

13. The system of claim 11, wherein the predetermined number is 2.

14. The system of claim 11, wherein said binary representation has a predetermined length, and wherein said symbol is arranged within each surface window by determining a position of a selected binary digit type within the length of the binary representation and placing the symbol within the surface window based on the determined position of the selected binary digit type.

15. The system of claim 14, wherein the selected binary digit type is "1".

* * * * *